US011794809B1

(12) United States Patent
Alghooneh et al.

(10) Patent No.: US 11,794,809 B1
(45) Date of Patent: Oct. 24, 2023

(54) VEHICLE AND TRAILER WHEEL PATH COLLISION DETECTION AND ALERT

(71) Applicant: GM GLOBAL TECHNOLOGY OPERATIONS LLC, Detroit, MI (US)

(72) Inventors: Mansoor Alghooneh, Richmond Hill (CA); Joseph K Moore, Whitby (CA); Norman J Weigert, Whitby (CA); Tommy Thai Ngoc Tran, Kitchener (CA)

(73) Assignee: GM GLOBAL TECHNOLOGY OPERTIONS LLC, Detroit, MI (US)

( * ) Notice: Subject to any disclaimer, the term of this patent is extended or adjusted under 35 U.S.C. 154(b) by 0 days.

(21) Appl. No.: 17/659,729

(22) Filed: Apr. 19, 2022

(51) Int. Cl.
*B62D 15/02* (2006.01)
*B60W 50/14* (2020.01)

(52) U.S. Cl.
CPC .......... *B62D 15/021* (2013.01); *B60W 50/14* (2013.01); *B60W 2050/146* (2013.01); *B60W 2300/14* (2013.01); *B60W 2420/42* (2013.01); *B60W 2554/4049* (2020.02)

(58) Field of Classification Search
CPC ..... B62D 15/02; B62D 15/021; B60W 50/14; B60W 2300/14; B60W 30/18; B60W 30/095
See application file for complete search history.

(56) References Cited

U.S. PATENT DOCUMENTS

| | | | |
|---|---|---|---|
| 9,845,043 B1* | 12/2017 | Webb | B60K 35/00 |
| 2007/0067081 A1* | 3/2007 | Ton | B60Q 9/008 |
| | | | 701/41 |
| 2014/0160276 A1* | 6/2014 | Pliefke | B62D 13/06 |
| | | | 348/118 |
| 2017/0169703 A1* | 6/2017 | Carrasco | B60Q 1/525 |
| 2017/0361763 A1* | 12/2017 | Webb | B60W 50/0098 |
| 2019/0276078 A1* | 9/2019 | Pourrezaei Khaligh | |
| | | | B62D 15/0295 |
| 2020/0019182 A1* | 1/2020 | Ling | B60D 1/62 |
| 2021/0354754 A1* | 11/2021 | Van Poucke | B62D 13/025 |
| 2022/0028271 A1* | 1/2022 | Koravadi | B60W 50/14 |
| 2023/0138848 A1* | 5/2023 | Larsson | B62D 15/025 |
| | | | 701/41 |

* cited by examiner

*Primary Examiner* — Tan Q Nguyen
(74) *Attorney, Agent, or Firm* — Lorenz & Kopf, LLP

(57) ABSTRACT

A method including detecting an obstacle location in response to an image, determining the obstacle location in response to a range measurement received from a range sensor, predicting a tow vehicle path in response to a tow vehicle steering angle and a tow vehicle location, predicting, by a processor, a trailer wheel path in response to the tow vehicle path, a vehicle dimension and a trailer dimension, and generating a warning control signal in response to an intersection of the obstacle location and the trailer wheel path.

20 Claims, 6 Drawing Sheets

VEHICLE AND TRAILER WHEEL PATH COLLISION DETECTION AND ALERT

INTRODUCTION

The present disclosure relates generally to a system for providing trailer guidance and assistance within a motor vehicle. More specifically, aspects of the present disclosure relate to systems, methods and devices for determining a trailer path during trailering operations, detecting objects within the determined trailer path and providing a warning to a vehicle system algorithm or a vehicle operator.

Personal motor vehicles have long been fitted with equipment to tow a trailer behind the vehicle. These trailers may include camping trailers, boat trailers or utility trailers. These trailers are typically physically connected to a vehicle trailer hitch mechanically fixed to a towing vehicle frame. The trailers are connected to the trailer hitch with a hitch arrangement coupled to a frame of the trailer. In addition, electrical connections are provided between the towing vehicle and the trailer to supply electrical power to trailer lighting and braking systems, as well as to couple electronic signals to control the application of the trailer brakes and illumination of various trailer lights, such as brake lights, turn signal lights, reverse lights and the like.

Difficulty arises in that during a trailering operation, a trailer path may be outside that of the tow vehicle path. During cornering, the trailer wheels often follow a path inside the wheels of the towing vehicle and trailer wheel contact may occur with curbs if the tow vehicle does not make a wide enough turn. This contact may cause damage to the trailer, the trailer wheels, and/or the curb. In addition, other parts of the trailer may contact objects that the towing vehicle has successfully avoided. It would be desirable to provide a means for providing feedback to a tow vehicle and/or a tow vehicle operator while overcoming the aforementioned problems.

SUMMARY

Disclosed herein are vehicle sensor methods and systems and related control logic for provisioning vehicle systems, methods for making and methods for operating such systems, and motor vehicles equipped with onboard control systems. By way of example, and not limitation, there are presented various embodiments of systems for the object detection and contact event prediction for a towing vehicle and a trailer.

In accordance with an aspect of the present disclosure, a method including detecting an obstacle location in response to an image, determining the obstacle location in response to a range measurement received from a range sensor, predicting a tow vehicle path in response to a tow vehicle steering angle and a tow vehicle location, predicting, by a processor, a trailer wheel path in response to the tow vehicle path, a vehicle dimension and a trailer dimension, and generating a warning control signal in response to an intersection of the obstacle location and the trailer wheel path.

In accordance with another aspect of the present disclosure, further including displaying an indicator of the obstacle location and an indicator of the trailer wheel path on a vehicle cabin display.

In accordance with another aspect of the present disclosure, wherein the image is captured by a camera mounted to the tow vehicle, wherein the camera has a forward field of view from the tow vehicle.

In accordance with another aspect of the present disclosure, where the obstacle location is confirmed in response to a depth measurement from a side view sensor mounted to the tow vehicle.

In accordance with another aspect of the present disclosure, wherein the vehicle dimension is a distance from a vehicle rear axle to a trailer hitch point and the trailer dimension is at least one of a distance from a trailer wheel axle to a trailer hitch point and a trailer track width.

In accordance with another aspect of the present disclosure, wherein the obstacle location is confirmed in response to a depth measurement from an ultrasonic sensor mounted to the tow vehicle.

In accordance with another aspect of the present disclosure, wherein the trailer wheel path is predicted in response to a trailer hitch articulation angle.

In accordance with another aspect of the present disclosure, wherein the tow vehicle path is predicted in response to at least one of an acceleration detected by an inertial measurement unit affixed to a tow vehicle and a displacement detected by a wheel encoder affixed to the tow vehicle.

In accordance with another aspect of the present disclosure, wherein the image is captured in response to a trailer system activation and a detection of motion of a tow vehicle.

In accordance with another aspect of the present disclosure, further including amending a map data in response to the obstacle location and the tow vehicle location and wherein the trailer wheel path is determined in response to the map data.

In accordance with another aspect of the present disclosure, wherein the warning control signal is generated in response to at least one of a time to collision and a distance between the obstacle location and the trailer wheel path.

In accordance with another aspect of the present disclosure, an apparatus including a camera configured for capturing an image of a field of view including an object, a distance sensor configured to determine a distance to the object, a processor configured to determine an object location relative to a tow vehicle location in response to the image, confirming the location of the object in response to the distance to the object, predicting a tow vehicle path in response to a tow vehicle steering angle and the tow vehicle location, predicting a trailer wheel path in response to the tow vehicle path, vehicle dimension and a trailer dimension, generating a warning control signal in response to an intersection of the object location and the trailer wheel path, and displaying a warning to a vehicle operator, by a user interface, in response to the warning control signal.

In accordance with another aspect of the present disclosure, wherein the obstacle is a curb.

In accordance with another aspect of the present disclosure, wherein the location sensor is a global positioning sensor.

In accordance with another aspect of the present disclosure, wherein the camera is a stereo camera for capturing a plurality of stereo images and wherein the object location is determined in response to the plurality of stereo images.

In accordance with another aspect of the present disclosure, wherein the distance sensor is a side view ultrasonic sensor.

In accordance with another aspect of the present disclosure, further including a memory for storing a map data and wherein the processor is further operative to amend the map data in response to the object location and the tow vehicle location and wherein the trailer wheel path is determined in response to the map data.

In accordance with another aspect of the present disclosure, the image is captured in response to a trailer system activation and a detection of a tow vehicle motion.

In accordance with another aspect of the present disclosure, wherein the vehicle dimension is a distance from a vehicle rear axle to a trailer hitch point and the trailer dimension is at least one of a distance from a trailer wheel axle to a trailer hitch point and a trailer track width.

In accordance with another aspect of the present disclosure, a trailer path hazard detection system including a trailer interface for detecting a connection to a trailer, a forward view camera for capturing a first image including a curb hazard, a side view camera for capturing a second image including the curb hazard, a range sensor for determining a distance to the curb hazard, a processor for estimating a location of the curb hazard in response to the first image, the second image relative to a tow vehicle location, confirming the location of the curb hazard in response to the distance to the curb hazard, predicting a tow vehicle path in response to a tow vehicle steering angle and the tow vehicle location, predicting a trailer wheel path in response to the tow vehicle path, a vehicle dimension and a trailer dimension, and generating a warning control signal in response to an intersection of the obstacle location and the trailer wheel path, and a display for displaying the second image and overlaying a first indicator of the curb location and a second indicator of the trailer wheel path over the second image.

In accordance with another aspect of the present disclosure, further including a speaker to generating an audible alert in response to the warning control signal.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
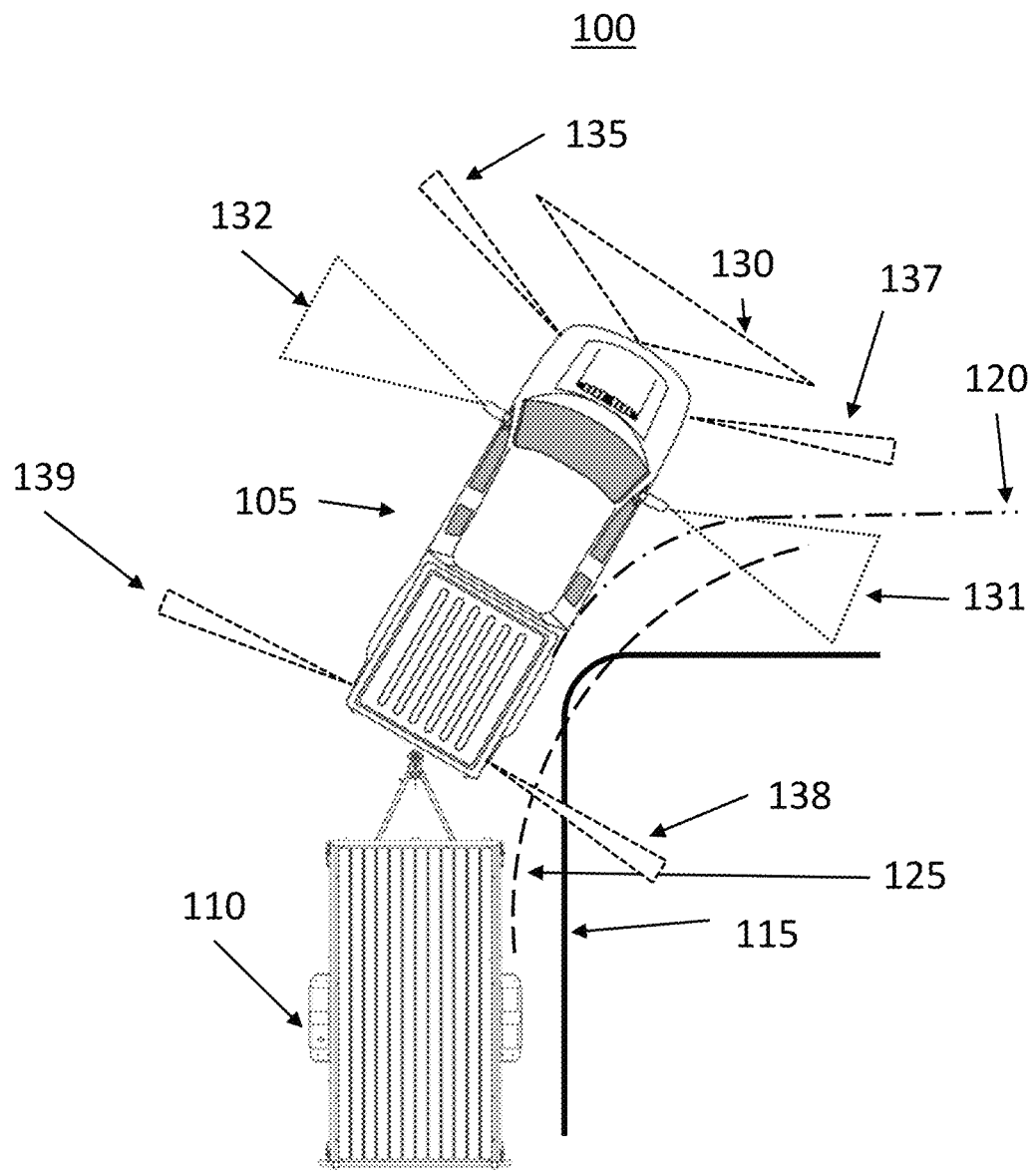
FIG. 1 shows an exemplary environment for use of the trailer path hazard detection system according to an embodiment of the present disclosure.

Turning now to FIG. 1, an environment 100 for use of the trailer path hazard detection system according to an exemplary embodiment of the present disclosure is shown. The exemplary environment 100 depicts a towing vehicle 105, a trailer 110. The towing vehicle 105 may be equipped with optical imaging sensors, for example a front view camera having a camera field of view (FOV) 130 and a right side view camera having a right side FOV 131 and a left side camera having a left side FOV 132, and range imaging sensors, for example, a front left ultrasonic sensor having a front left ultrasonic detection zone 135, a front right ultrasonic sensor having a front right ultrasonic detection zone 137, a rear left ultrasonic sensor having a rear left ultrasonic detection zone 139 and a rear right ultrasonic sensor having a rear right ultrasonic detection zone 138.

It is desirable to vehicle operators to keep vehicles and trailers from being scratched or damaged. One source of damage to vehicles and trailers wheels is damage from curbs and parking blocks primarily caused by contact of the wheel rim with the curb while turning. The exemplary system is configured to perceive curb hazards and estimate a vehicle wheel path 120 with relation to curb and other object hazards that can occur and provide guidance to the driver to help prevent collisions. The exemplary system is configured to perceive curb hazards and estimate a trailer wheel path 125 with relation to curb and other object hazards that can occur and provide guidance to the driver to help prevent collisions during trailering operations. The exemplary system may employ a fusion of vehicle perception sensors, including optical image sensors such as cameras, and range imaging sensors such as ultrasonic sensors, lidar, or short range radar, and other vehicle kinematic and dynamic data along with algorithms to detect, localize, track, and alert curb hazards and other hazardous objects inside the turning radius of the trailer.

In some exemplary embodiments, a tow vehicle 105 is configured with a system to perceive curbs and other hazards proximate to the tow vehicle 105 and trailer 110 when performing a trailering operation. The exemplary system determines if the vehicle wheels or trailer wheels or other parts of the trailer may contact a curb 115 or other hazard. If so, the exemplary system then provides guidance to a vehicle operator or a vehicle control system to help prevent these contact events and subsequent damage to the vehicle 105 or trailer 110.

The exemplary system may incorporate a number of perception sensors including optical imaging sensors for example front and side cameras, and range imaging sensors for example ultrasonic sensors or short-range radars, along with a processor, an algorithm, and customer interface. In some exemplary embodiments, the tow vehicle 105 may be equipped with ultrasonic sensors on the front corner and rear corner of the tow vehicle 105 used to detect and localize a curb and/or other objects next to the tow vehicle 105. The tow vehicle 105 is further equipped with one or more forward view cameras having a forward field of view 130 and left and right side view cameras having a left side field of view 132 and a right side field of view 131.

In some exemplary embodiments, the system may be configured to perform a sensor fusion of the detections of each of the sensors to generate a local area map referenced to the tow vehicle 105. As the tow vehicle 105 moves, the local area map is updated with newly acquired information and existing information is confirmed or updated in response to subsequent sensor data. Combining data from several sources using multi sensor data fusion algorithms exploits the data redundancy to reduce object location uncertainty. In some exemplary embodiments, the sensor data may be fused using Bayesian fusion algorithms with Kalman filtering.

The system may further perform an estimation model to detect and localize a curb or objects inside the curb by fusing two set of complementary on-board vehicle sensors, including optical imaging sensors such as surrounding cameras, and range imaging sensors such as ultrasonic sensors. The estimation model may use a camera-based algorithm to capture and map front and side views from the tow vehicle 105 and then fuses side ultrasonic sensors with the front view and side view cameras using a model-based or non-model-based Bayesian filtering. In some exemplary embodiments, the curb hazards or obstacles that were detected using the fusion of cameras, and ultrasonic sensors, may be combined to generate a map of the area around the tow vehicle 105.

The system may be further configured to monitor tow vehicle and trailer telemetry, such as tow vehicle steering angle and velocity. In response to the telemetry, the system is then configured to predict the tow vehicle and trailer odometry in response to the telemetry. This tow vehicle and trailer odometry maps the predicted tow vehicle wheel path 120 and/or predicted trailer wheel path 125. This predicted trailer wheel path 125 may be compared to detected obstacles and curbs on the local map. If a contact event is predicted in response to the predicted trailer wheel path 125, an alert may be transmitted to the vehicle operator via a user interface, such as an audible alert, warning light, seat vibration, or a graphic on an in-vehicle cabin display.

A landmark estimation model may be further employed to enhance the estimation model through the local odometry algorithm that fuses multiple on-board sensors such as GPS, IMU, wheel pulses, steering angles. The exemplary algorithm may use local odometry to spatiotemporal stamp the landmarks, and as a result generate a local map of the recently seen landmarks. The algorithm may then utilize a kinematics/dynamics model of the tow vehicle 105 with/without the trailer 110 to estimate the projected path of the tow vehicle 105 or trailer wheels and to assess that whether that path would collide with the detected landmarks in the local map. The path guideline is annotated on the viewing system for the feature to interact with the driver. The path guideline may adapt and change with changes in the steering direction and hitch articulation angle.

The exemplary system may further include a user interface for providing feedback to a vehicle operator, such as audible chimes, displays, and haptic feedback when a potential hazard is detected. For example, guidelines may be displayed to a vehicle operator where guideline color may represent likelihood of a potential collision between the trailer wheels and curb based on the distance of the wheels to the curb as well as the time to collision of the wheels to the curb.

Figure 2:
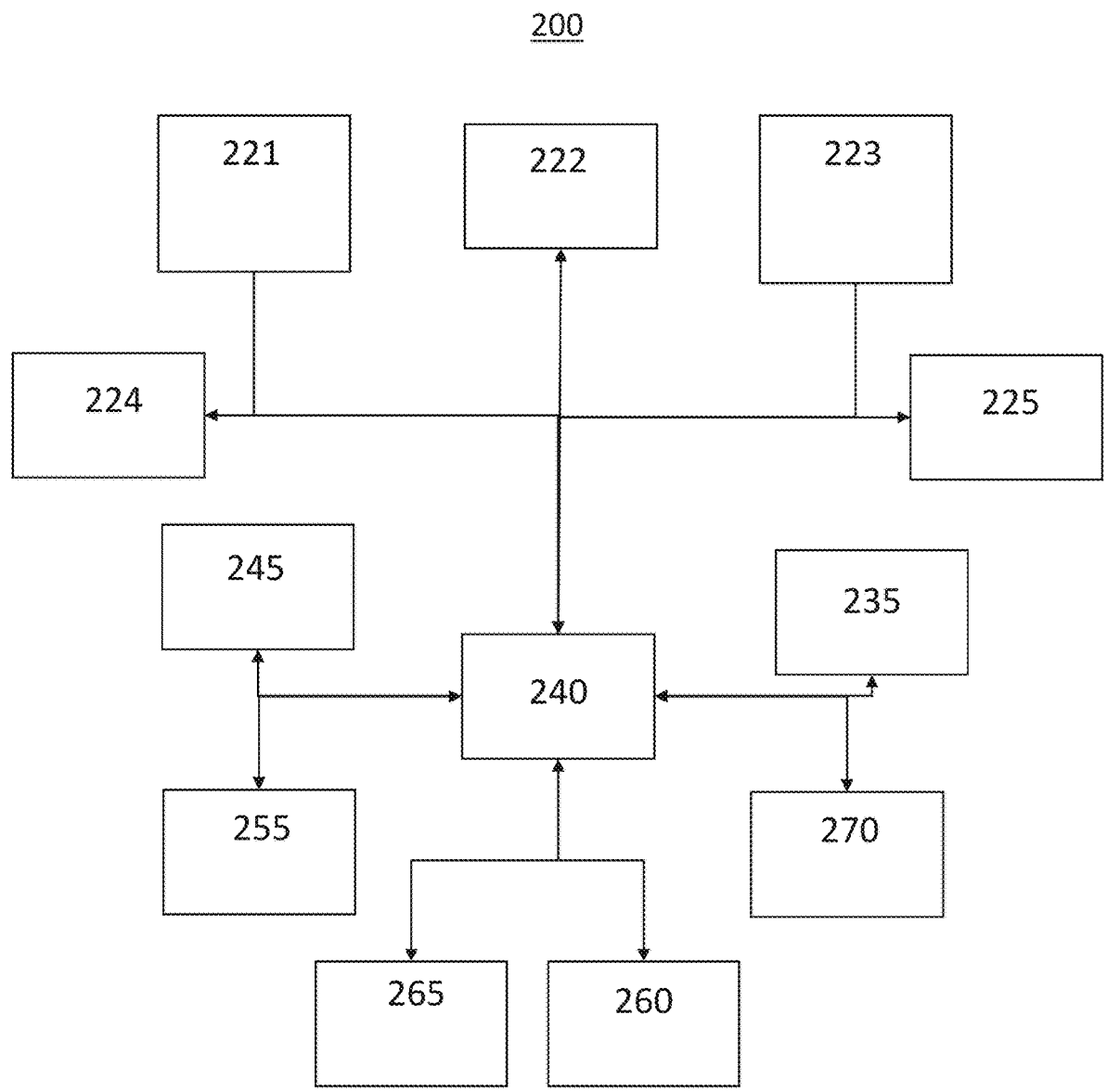
FIG. 2 shows a block diagram illustrating a system for implementing the trailer path hazard detection system according to an exemplary embodiment of the present disclosure.

Turning now to FIG. 2, a block diagram illustrating a system 200 for implementing a trailer path hazard detection system according to an exemplary embodiment of the present disclosure is shown. The exemplary system 200 may be located in a towing vehicle and include a processor 240, a left side range imaging sensor 221, a right side range imaging sensor 223, a left side optical sensor 224, a right side optical sensor 225, a camera 222, a global positioning system (GPS) sensor 245, an inertial measurement unit (IMU) sensor 235, a vehicle controller 270, a user interface 260, a memory 265 and a trailer interface 255.

The camera 222 may be a front facing camera installed on a forward portion of the towing vehicle, such as a front facia or behind a rear view mirror. The camera 222 may include one or more image sensors for capturing a forward facing field of view from the front of the towing vehicle. In some exemplary embodiments images captured by the camera 222, the left side optical sensor 224 and/or the right side optical sensor 225 may be fused to generate a combined image of an area proximate to the tow vehicle.

If more than one image sensor is used, a stereo image may be generated. Image processing algorithms may be performed on the stereo image to estimate depth information in the forward field of view. One or more images captured by the camera 222 may then be coupled to the processor 240. In addition, the exemplary system may include one or more side optical sensors, such as a left side optical sensor 224, a right side optical sensor 225, used to capture images and/or determine depth information for left and right sides of the vehicle and/or trailer.

The left side range imaging sensor 221 and the right side range imaging sensor 223 may be range imaging sensors and/or depth sensors configured to transmit a pulse, receive a reflection of the pulse and estimate a distance to a vertical surface of an object, such as a curb or other obstacle, in response to the propagation time of the transmitted pulse. The left side range imaging sensor 221 and the right side range imaging sensor 223 may have fields of view orthogonal to the centerline of the tow vehicle and may be oriented such that the field of view cover an expected location of a curb or other objects proximate to the side of the tow vehicle. In some exemplary embodiments, the left side range imaging sensor 221 and the right side range imaging sensor 223 may be ultrasonic sensors configured to transmit ultrasonic audio pulse. The distance to a curb or object may be estimated in response to the propagation time of the ultrasonic audio pulse. Alternatively, the left side range imaging sensor 221 and the right side range imaging sensor 223 may be lidar sensor, radar, or other range sensing device.

The GPS 245 is configured to receive a plurality of time stamped satellite signals including the location data of a transmitting satellite. The GPS sensor 245 then uses this information to determine a precise location of the GPS sensor 245. The processor 240 may be operative to receive the location data from the GPS sensor 245 and/or store this location data to the memory 265. The memory 265 may be operative to store map data for use by the processor 240.

The IMU 235 is a device used to report a specific force of a body, such as the angular or linear acceleration of the body to which it is attached. The IMU 235 may measure angular or linear acceleration and may be used to determine a lateral acceleration, a longitudinal acceleration, a yaw rate and pitch of a vehicle. The IMU 235 is mounted within the tow vehicle and is operative to generate a control signal indicative of the measured specific forces and to couple this control signal to the processor 240.

The user interface 260 may be operative to provide a human machine interface between the vehicle control system and the driver. The user interface 260 may be a touch sensitive display screen, a display, one or more buttons, dials, switches, etc., and or one or more light emitting diodes, audio generation devices, such as a speaker, or other indicators. The user interface 260 is operative to receive user requests such as a request for activating a vehicle system, such as settings for an ADAS operation. In an exemplary embodiment, the user interface 260 may be operative to receive an activation of a trailering mode in a tow vehicle in response to a user input. The user interface 260 may be further configured to display user alerts if a vehicle or trailer contact event is predicted. The user interface 260 may display a predicted tow vehicle path and/or a predicted trailer path on a display within the tow vehicle cabin. The user interface 260 may be configured to receive trailer dimension and/or configuration information in response to a user input or may initiate a trailer dimension estimation algorithm in response to a user input.

In some exemplary embodiments, the user interface 260 may provide audible and/or visual warnings to a driver which are intensified in response to time to collision and/or distance to collision. For example, as a projected trailer wheel path passes within a threshold distance to a curb or other object, the color of a displayed trailer wheel path indicator may change from green to yellow, or from yellow to red. An audible alert may be generated by the user interface 260 in response to the projected trailer wheel path passing within a threshold distance to a curb or other object. An amplitude or frequency of an audible alert may be altered in response to a changed in distance between a projected wheel path and an obstacle such as a curb.

The vehicle controller 270 may be operative to control the vehicle operations in response to a control algorithm or the like. In an exemplary embodiment, the vehicle controller 270 may be operative to generate vehicle control signals for coupling to a throttle controller, a brake controller, and a steering controller or the like for control of the vehicle in response to an advanced driver assistance system (ADAS) algorithm or in response to a vehicle operator input via a steering wheel, vehicle pedals, and the like. The vehicle controller 270 may further be operative to generate system control signals for coupling to the processor 240, indicative of such information as speed of the vehicle, acceleration, vehicle motion cycles, vehicle operator input state, trailer etc.

The trailer interface 255 may be a module within the tow vehicle configured to receive and transmit control signals and/or data to the trailer. The trailer interface 255 may be electrically coupled to a trailer connector socket. The socket may be a 7 pin electrical socket with each of the pins separately electrically coupled to the trailer interface 255. The socket is configured for receiving a plug that is electrically coupled to a wiring system of the trailer with an electrical cord long enough to stay affixed to the socket on the towing vehicle while accommodating the movement of the trailer during towing operations. In some exemplary embodiments, the trailer interface 255 may be configured to detect the insertion of the plug into the socket. This detection may be made in response to a change in capacitance or voltage on one or more of the electrical connections to the socket. For example, the trailer interface 255 may detect a change in voltage on the ground pin of the socket. Alternatively, the insertion may be detected in response to a change of state of a physical switch, such as a button switch being depressed by the plug as the plug is inserted into the socket.

The processor 240 is configured to perform the trailer path hazard detection algorithm. In response to the image data received from the camera 222 and depth map information received from each of the left side range imaging sensor 221 and the right side range imaging sensor 223, the processor 240 is first configured to generate a local area map of objects and roadway features, such as curbs, proximate to the tow vehicle. The processor 240 may augment this local area map with map data stored in the memory 265 or map data received from other sources. The local area map is continuously updated as image data and depth information is received. The location of the tow vehicle and the trailer are localized within the local area map such that distances between the detected obstacles, the tow vehicle position and the trailer position may be determined.

The processor 240 is further configured to receive vehicle telemetry data, such as vehicle speed, steering angle, braking information and the like, from the vehicle controller 270. The processor 240 may further receive acceleration data from the IMU 235. In response to the telemetry data and the acceleration data, the processor 240 is configured to estimate an anticipated tow vehicle path. In response to the anticipated tow vehicle path, hitch articulation angle, tow vehicle geometry and trailer geometry and measurements, the processor 240 next predicts an anticipated trailer path. The anticipated tow vehicle path and the anticipated trailer path are compared with the map data and possible contact events with the tow vehicle, the trailer, or the trailer wheels are predicted. If a possible contact event is predicted, an alert control signal is generated and coupled to the user interface 260 and/or the vehicle controller 270. In some exemplary embodiments, the possible contact event may be based on the distance of the wheels to the curb as well as the time to collision of the wheels to the curb. The vehicle controller 270 may provide the alert control signals as information to an ADAS algorithm for assisted or autonomous vehicle operation.

In some exemplary embodiments, the processor 240 may first receive an image and/or image data from the camera 222 depicting the forward field of view from the tow vehicle. The processor 240 may then perform edge detection techniques, or other image processing techniques, to estimate the location of curbs proximate to the tow vehicle. The processor 240 may subsequently receive depth data from the left side range imaging sensor 221 and the right side range imaging sensor 223 generated in response to a pulse reflection from one or more vertical surfaces and confirm the location of the curbs. This confirmed information is stored as a map data in the memory 265 or other accessible memory. The processor 240 may then predict a trailer path in response to trailer measurements and tow vehicle telemetry. In response to the predicted trailer path, the processor 240 may next predict any possible contact events between the tow vehicle, tow vehicle wheels, and/or trailer wheels and the curb. If a contact event is predicted, a warning signal is coupled from the processor 240 to the user interface 260 in order to alert a vehicle operator to the possible contact event.

In some exemplary embodiments, a top view of the tow vehicle and the trailer may be generated from various cameras around the tow vehicle and/or the trailer. A tow vehicle image and a trailer image may be overlaid on the top view as well as indicators of the predicted tow vehicle path and the predicted trailer path. Curbs, roadway indicators, and other objects may be highlighted or indicated on the top down view with additional overlays. Predicted contact points may be indicated on the top down view. For example, possible contact points may be highlighted in a color, such as red, be indicated by an icon, such as an explosion icon, or may be otherwise indicated to the vehicle operator.

Figure 3:
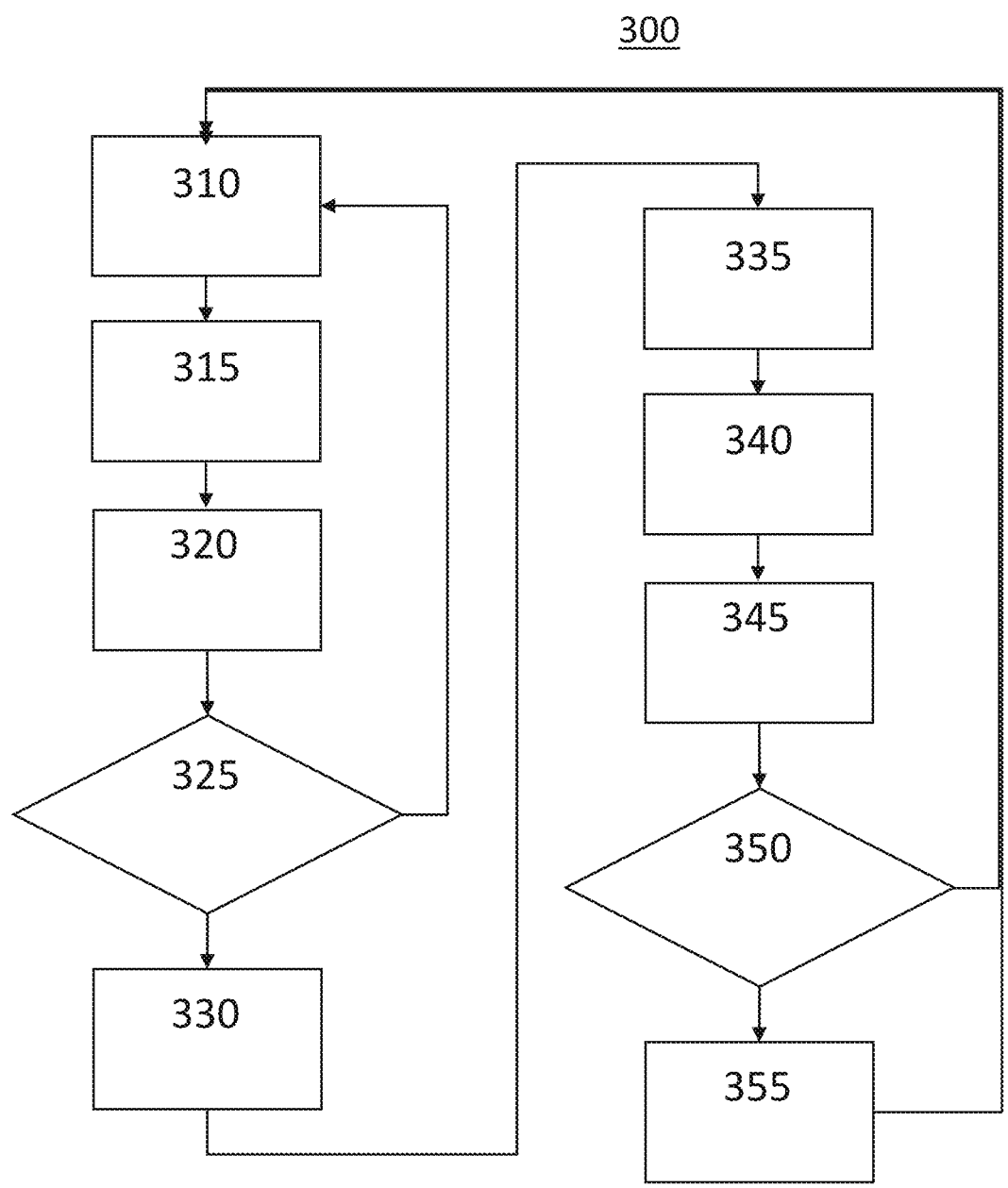
FIG. 3 shows a flow chart illustrating an exemplary method for controlling the trailer path hazard detection system according to an exemplary embodiment of the present disclosure.

Turning now to FIG. 3, a flow chart illustrating an exemplary method 300 for controlling a trailer path hazard detection system according to an exemplary embodiment of the present disclosure is shown.

The method is first configured to receive 310 an image from a camera mounted to the tow vehicle. The camera may be a wide angle camera having a forward field of view from the tow vehicle, or may be a wide angle camera having a side field of view from the tow vehicle. In some exemplary embodiments, the camera may include a plurality of image sensors capable of capturing a stereo image wherein depth information may be determined for objects within the stereo image. The image, or a series of images captured at regular time intervals, may be then coupled to an image processor. In some exemplary embodiments, the processor may be configured to detect horizontal edges or lines within the image which may be indicative of a curb.

The method is next operative to detect 315 objects within the captured image or plurality of images. The method may use sequential images captured at different times to estimate distances to objects using the parallax within the images caused by movement of the tow vehicle. In some exemplary embodiments, the imaged may be converted to grayscale, an inverse perspective mapping performed, followed by image smoothing. Canny edge detection may be used to detect edges within the image, such as curbs, light posts, etc. A Hough transform may also be employed to extract features from the images to detect instances of edges or other shapes.

The method is next operative to receive 320 depth information from the side view sensors having a side field of view near the front of the towing vehicle. These side view sensors may include ultrasonic sensors, cameras, lidar, radar, or the like. In some exemplary embodiments, the side view sensors are configured to generate depth maps of their respective fields of view and to couple these depth maps to the processor. The depths may be indicative of a distance from the side view sensor to a vertical surface. In some exemplary embodiments, depth information is coupled to the processor, such as two dimensional depth information that is captured at regular time intervals with the movement of the tow vehicle. For example, the field of view may be a vertical fan shape returning a plurality of depths at varying elevations with a single azimuth. The movement of the tow vehicle enables a variation in the azimuth measurements used to generate the depth map.

The method is next operative to confirm 325 object locations detected from the image using the received depth information from the side view sensors. For example, a horizontal edge detected in the image may be correlated with a vertical edge detected in response to the depth information to estimate a location of a curb. If the object location is not confirmed, the method returns to receive 310 the next image. If the location is confirmed, the method then updates 330 a map information stored in a memory.

The method is configured to update 330 the map with object locations in response to a landmark estimation model that fuses the front view captured by the camera and the depth information captured by the side view sensors using Bayesian filtering. The stored map coverage may be cropped in response to the tow vehicle position. For example, the method may store map information for a predetermined radius around the tow vehicle, discarding object information once the object falls out of the predetermined radius.

The method is next configured to receive 335 telemetry information from the tow vehicle controller or other tow vehicle sensors. The telemetry information may include vehicle velocity, location, speed, steering angle, brake application level, various accelerations detected by a vehicle IMU or the like. The landmark estimation model may be further enhanced through the local odometry algorithm that fuses multiple on-board sensors such as GPS, IMU, wheel pulses, steering angles using Bayesian filtering.

The method next predicts 340 a tow vehicle path in response to the received telemetry information. The tow vehicle path is predicted using the local map and a kinematics/dynamics model of the tow vehicle to estimate the projected path of the vehicle. The method next uses the predicted tow path, the trailer dimensions and, in some exemplary embodiments, the hitch articulation angle, to predict 345 the trailer path. Specifically, the method may predict the trailer wheel paths.

The method next predicts 350 possible contact events in response to the map data and the predicted trailer path. In some exemplary embodiments, the trailer path hazard detection algorithm may assess whether the trailer wheel path may intersect with the detected landmarks in the local map. If no intersection is predicted, indicating that a contact event will not occur, the method is configured to return to receiving 310 the next image.

If a contact event is predicted, the method is next configured to generate 355 an alert to provide to the vehicle operator or a vehicle control system performing an ADAS algorithm. For an alert provided to the vehicle operator, a projected trailer path guideline may be annotated on a graphical user interface of a vehicle cabin display. In some exemplary embodiments, the path guideline may be adaptive and changing location with respect to an indicated obstacle with change in the steering wheel and hitch articulation angle. For example, a curb may be indicated on the display and the projected trailer wheel path may also be projected. As the projected trailer wheel path approaches the curb location, the indicated projected trailer wheel path gets closer to the curb indicator and the color of the indicated projected trailer wheel path may change color to highlight the increased likelihood of a contact event. An audible alert, haptic alert, or other vehicle operator warning may be generated when a distance to an intersection between the projected trailer wheel path and the obstacle reaches a threshold distance. After the alert is generated, the method returns to receiving 310 a subsequent image.

In some exemplary embodiments, the method utilizes the vehicle odometry model to create a spatiotemporal map of the recently seen landmarks, by fusing sensors included but not limited to cameras, ultrasonics (and/or short range radars), vehicle dynamics and kinematics sensors and model included but not limited to steering wheel angle, GPS, IMU, wheel encoder. The method fuses the spatiotemporal map of the landmarks as well as the projected/predictive trajectory of the vehicle/trailer wheels developed to assess whether the vehicle wheels are about to collide with these landmarks, based on distance of the wheels to the landmarks or time to collision of the wheels to the landmarks or a combination of both.

The method may determine the projected or predictive trajectory of the vehicle/trailer wheels by utilizing the vehicle/trailer model including, but not limited to, dynamics or kinematics model as well as the vehicle on-board sensors including but not limited to the steering wheel angle and IMU, along with the hitch articulation angle between the vehicle and trailer and other vehicle and trailer dimensions. The vehicle operator user interface and/or feedback system may utilize the assessment and provide feedback to the driver that may include for example audible chimes, displays, and haptic feedback when a potential hazard is detected. Examples include, but are not limited to, guideline color represents potential collision between the trailing wheels and curb based on the distance of the wheels to the curb as well as the time to collision of the wheels to the curb.

Figure 4:
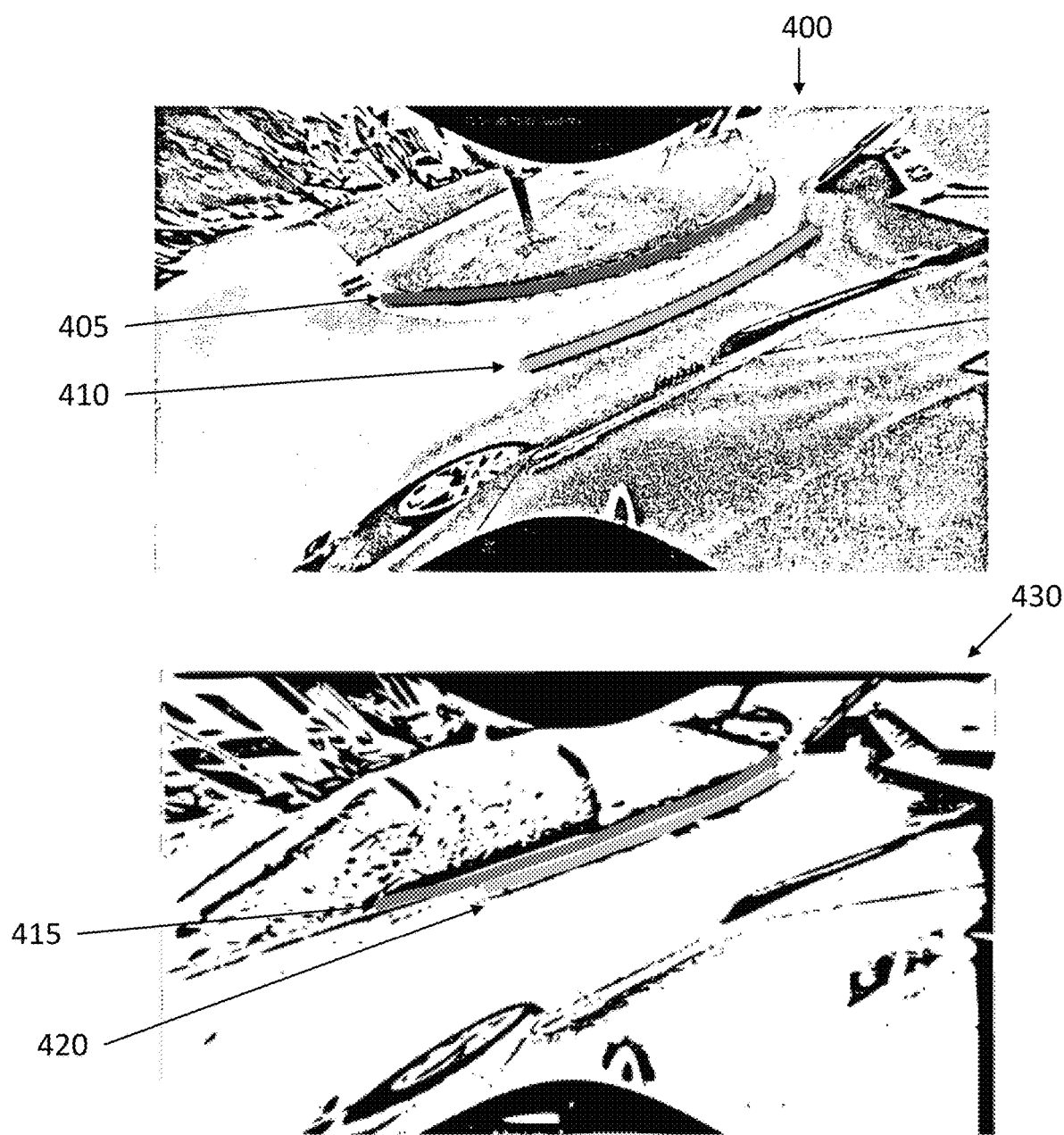
FIG. 4 shows a user interface display for providing driver feedback from trailer path hazard detection system according to an exemplary embodiment of the present disclosure.

Turning now to FIG. 4, an exemplary user interface display for providing driver feedback from trailer path hazard detection system according to an exemplary embodiment of the present disclosure is shown. The first image 400 is indicative of a side view from the tow vehicle where the tow vehicle is beginning to execute a right turn around a corner during a towing operation. The detected curb is highlighted by the system by overlaying a first indicator 405 over the detected curb. A trailer guideline 410 is also overlaid on the user interface image to identify to the driver the projected trailer wheel path. The first indicator 405 and the trailer guideline 410 may be depicted in different colors on the user interface image. In some exemplary embodiments, as the turn progresses and where the projected trailer wheel path is approaching the curb, the color of the trailer guideline may change colors to communicate the increased risk of curb collision to the vehicle operator.

The second image 430 is indicative of a turn where the projected trailer wheel path is close to contacting the curb. In some exemplary embodiments, the curb indicator 415 and the trailer guideline 420 are show as nearly overlapping on the user interface image. In some exemplary embodiments, the color of the trailer guideline may again change color to communicate the imminent curb collision to the vehicle operation. In addition, additional alerts may be provided to the vehicle operation, such as a haptic alert, audible alert, flashing light emitting diodes, or the like, indicative of the imminent curb collision.

Figure 5:
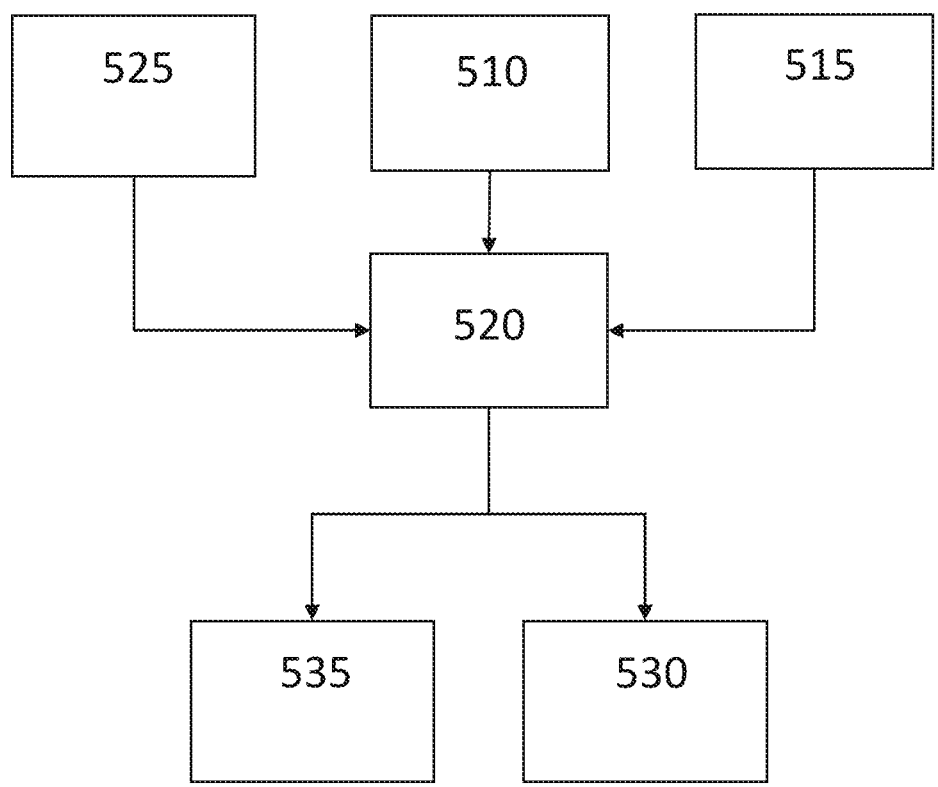
FIG. 5 shows a block diagram illustrating a system for implementing the trailer path hazard detection system according to an exemplary embodiment of the present disclosure.

Turning now to FIG. 5, a block diagram of a trailer path hazard detection system 500 according to an exemplary embodiment of the present disclosure is shown. The exemplary system may include a camera 510, a distance sensor 515, a processor 520, a location sensor 525, a memory 535 and a user interface 530.

The camera 510 may be configured for capturing an image of a field of view including an object. In some exemplary embodiments, the object is a curb. The obstacle may be another obstacle, such as a traffic sign, safety bollard, light post, utility pole, or the like, located close to an edge of the roadway. In some exemplary embodiments, the camera may be a stereo camera for capturing a plurality of stereo images and wherein the object location is determined in response to the plurality of stereo images. The image may be captured in response to a trailer system activation and a detection of a tow vehicle motion.

The distance sensor 515 is configured for determining a distance to the object. The distance sensor 515 may have a side facing field of view and may determine the distance to the object at a different time than when the image of the object was captured with the camera. These detections at different times may be correlated using the tow vehicle locations at the different times to confirm the object location and generate a map data in response to the object location. In some exemplary embodiments, the distance sensor 515 may be a side view ultrasonic sensor.

The location sensor 525 is configured for determining a tow vehicle location. The location sensor 525 may be a global positioning sensor and may determined the vehicle location in response to data transmitted from a plurality of satellites. Alternatively, the location sensor may use vehicle to infrastructure (V2I) signals from local infrastructure to determine a tow vehicle location.

The processor 520 is configured for detecting an object location in response to the image and the tow vehicle location. The processor 520 may use image processing techniques such as edge detection to detect the object within the image. The processor 520 may further estimate a distance to the object in response to one or more images and the tow vehicle location.

The processor 520 may be further operative for predicting a tow vehicle path in response to a tow vehicle steering angle and the tow vehicle location. The tow vehicle path may be localized to a map data stored in the memory 535 and added to the map data. The processor 520 may then predict a trailer wheel path in response to the tow vehicle path and a trailer dimension. In some embodiments, the trailer dimension is a distance from a trailer wheel to a trailer hitch point. Alternatively, the trailer dimension may include a plurality of dimensions such as trailer track width, distance from the hitch point to the trailer axle, trailer width, trailer height, trailer length, hitch mechanism length, and hitch articulation angle. The processor may be further configured for generating a warning control signal in response to an intersection of the object location and the trailer wheel path.

The user interface 530 may be configured for displaying a warning in response to the warning control signal. The user interface 530 may be a warning light, a speaker for playing an audible alarm, or a haptic device. The user interface may be a display within a vehicle cabin for displaying one or more images including the curb, for overlying a highlight on the curb, and for displaying an indication of the trailer wheel path.

The exemplary system may further include a memory 535 for storing a map data and wherein the processor is further operative to amend the map data in response to the object location and the tow vehicle location and wherein the trailer wheel path is determined in response to the map data.

In some exemplary embodiments, the trailer path hazard detection system 500 may include a trailer interface for detecting a connection to a trailer, a forward view camera for capturing a first image including a curb, a side view camera for capturing a second image including the curb, a processor for determining a curb location in response to the first image, the second image and a tow vehicle location, predicting a tow vehicle path in response to a tow vehicle steering angle and the tow vehicle location, predicting a trailer wheel path in response to the tow vehicle path and a trailer dimension, and generating a warning control signal in response to an intersection of the obstacle location and the trailer wheel path, and a display for displaying the second image and overlaying a first indicator of the curb location and a second indicator of the trailer wheel path over the second image. The trailer path hazard detection system 500 may further include a speaker to generating an audible alert in response to the warning control signal.

Figure 6:
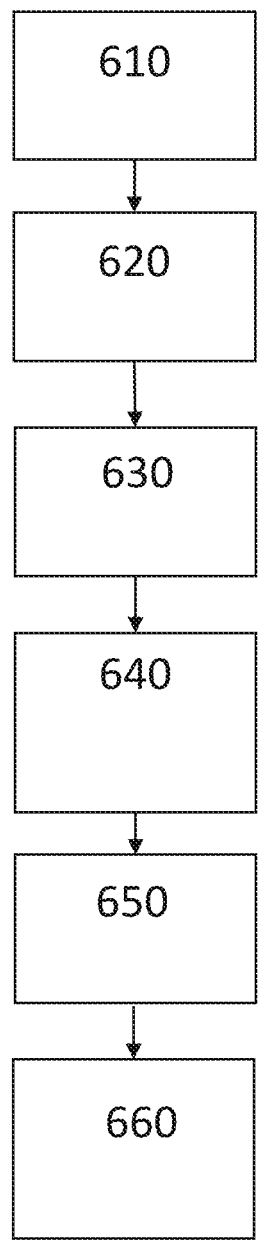
FIG. 6 shows another flow chart illustrating an exemplary method for controlling the trailer path hazard detection system according to an exemplary embodiment of the present disclosure.

Turning now to FIG. 6, a flow chart illustrating an exemplary method 600 for implementing a trailer path hazard detection system according to an exemplary embodiment of the present disclosure is shown. The exemplary method may be performed by a processor within a tow vehicle. The processor may be communicatively coupled to sensors, controllers, and interfaces within the tow vehicle. The processor may further be communicatively coupled to a user interface, such as a vehicle cabin display, a vehicle infotainment system or an application running on a smartphone or the like.

The exemplary method may detect 610 an obstacle location in response to an image where the image is captured by a camera mounted to the tow vehicle. The camera may have a forward field of view from the tow vehicle. In some exemplary embodiments, the obstacle location may be confirmed in response to a depth measurement from a side view sensor mounted to the tow vehicle. The obstacle location may be confirmed in response to a depth measurement from an ultrasonic sensor mounted to the tow vehicle. The image may be captured in response to a trailer system activation and a detection of motion of a tow vehicle.

The method may predict 620 a tow vehicle path in response to a tow vehicle steering angle and a tow vehicle location. In addition, the tow vehicle path may be predicted in response to vehicle telemetry, map data, and location sensor data. For example, the tow vehicle path may be predicted in response to an acceleration detected by an inertial measurement unit affixed to a tow vehicle. In some embodiments, the tow vehicle path may be predicted in response to a displacement detected by a wheel encoder affixed to a tow vehicle.

The method may next predict 630 a trailer wheel path in response to the tow vehicle path and vehicle and trailer dimensions. The vehicle dimension may be the distance from the vehicle rear axle to the trailer hitch point. The trailer dimension may be a distance from a trailer wheel axle to a trailer hitch point and a trailer track width. The trailer wheel path may be predicted in response to a trailer hitch articulation angle.

The method may then compare the predicted trailer wheel path and the obstacle location to determine if a contact event may occur. A contact event may occur if there is a predicted intersection of the obstacle location and the trailer wheel path. The method may generate 640 a warning control signal in response to the predicted contact event. In some exemplary embodiments, the method may be operative for displaying 650 an indicator of the obstacle location and an indicator of the trailer wheel path on a vehicle cabin display. A display color of the trailer wheel path indicator may change in response to a current distance between the trailer wheel and the obstacle. The method may further be operative for amending 660 a map data in response to the obstacle location and the tow vehicle location and wherein the trailer wheel path is determined in response to the map data While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   detecting an obstacle location in response to an image;
   determining the obstacle location in response to a range measurement received from a range sensor;
   predicting a tow vehicle path in response to a tow vehicle steering angle and a tow vehicle location;
   predicting, by a processor, a trailer wheel path in response to the tow vehicle path, a vehicle dimension and a trailer dimension;
   displaying an indicator of the trailer wheel path on a vehicle cabin display wherein a color of the indicator of the trailer wheel path changes in response to a minimum distance between the trailer wheel path and the obstacle location; and
   generating a warning control signal in response to an intersection of the obstacle location and the trailer wheel path.

2. The method of claim 1, further including displaying an indicator of the obstacle location on the vehicle cabin display.

3. The method of claim 1, wherein the image is captured by a camera mounted to a tow vehicle, wherein the camera has a forward field of view from the tow vehicle.

4. The method of claim 1, where the obstacle location is confirmed in response to a depth measurement from a side view range sensor mounted to a tow vehicle.

5. The method of claim 1, wherein the vehicle dimension is a distance from a vehicle rear axle to a trailer hitch point and the trailer dimension is at least one of a distance from a trailer wheel axle to the trailer hitch point and a trailer track width.

6. The method of claim 1 where the obstacle location is confirmed in response to a depth measurement from an ultrasonic sensor mounted to a tow vehicle.

7. The method of claim 1, wherein the trailer wheel path is predicted in response to a trailer hitch articulation angle.

8. The method of claim 1, wherein the tow vehicle path is predicted in response to a displacement detected by a wheel encoder affixed to a tow vehicle.

9. The method of claim 1 wherein the image is captured in response to a trailer system activation and a detection of motion of a tow vehicle.

10. The method of claim 1, wherein the warning control signal is generated in response to at least one of a time to collision and a distance between the obstacle location and the trailer wheel path.

11. An apparatus comprising:
    a camera configured for capturing an image of a field of view including an object;
    a distance sensor configured to determine a distance to the object;
    a processor configured to determine an object location relative to a tow vehicle location in response to the image, confirming the location of the object in response to the distance to the object, predicting a tow vehicle path in response to a tow vehicle steering angle and the tow vehicle location, predicting a trailer wheel path in response to the tow vehicle path, a vehicle dimension and a trailer dimension;
    generating a warning control signal in response to an intersection of the object location and the trailer wheel path; and
    displaying on a vehicle cabin display, a warning to a vehicle operator, by a user interface, in response to the warning control signal and an indicator of the trailer wheel path wherein a color of the indicator of the trailer wheel path changes in response to a minimum distance between the trailer wheel path and the object location.

12. The apparatus of claim 11, wherein the object is a curb.

13. The apparatus of claim 11, wherein the tow vehicle location is determined in response to a global positioning sensor.

14. The apparatus of claim 11, wherein the camera is a stereo camera for capturing a plurality of stereo images and wherein the object location is determined in response to the plurality of stereo images.

15. The apparatus of claim 11, wherein the distance sensor is a side view ultrasonic sensor.

16. The apparatus of claim 11, further including a memory for storing a map data and wherein the processor is further operative to amend the map data in response to the object location and the tow vehicle location and wherein the trailer wheel path is determined in response to the map data.

17. The apparatus of claim 11, the image is captured in response to a trailer system activation and a detection of a tow vehicle motion.

18. The apparatus of claim 11, wherein the vehicle dimension is a distance from a vehicle rear axle to a trailer hitch point and the trailer dimension is at least one of a distance from a trailer wheel axle to the trailer hitch point and a trailer track width.

19. A trailer path hazard detection system comprising:
- a trailer interface for detecting a connection to a trailer;
- a forward view camera for capturing a first image including a curb hazard;
- a side view camera for capturing a second image including the curb hazard;
- a range sensor for determining a distance to the curb hazard;
- a processor for estimating a location of the curb hazard in response to the first image, the second image relative to a tow vehicle location, confirming the location of the curb hazard in response to the distance to the curb hazard, predicting a tow vehicle path in response to a tow vehicle steering angle and the tow vehicle location, predicting a trailer wheel path in response to the tow vehicle path, a vehicle dimension and a trailer dimension, and generating a warning control signal in response to an intersection of the curb hazard and the trailer wheel path; and
- a display for displaying the second image and overlaying a first indicator of the curb hazard and a second indicator of the trailer wheel path over the second image wherein a color of the second indicator of the trailer wheel path changes in response to a minimum distance between the trailer wheel path and the location of the curb hazard.

20. The trailer path hazard detection system of claim 19 further including a speaker to generating an audible alert in response to the warning control signal.

\* \* \* \* \*